Patented Dec. 12, 1950

2,533,764

UNITED STATES PATENT OFFICE 2,533,764

HETEROCYCLICTHIOL RESINS

Philip D. Caesar, Wenonah, and Alexander N. Sachanen, Woodbury, N. J., assignors to Socony-Vacuum Oil Company, Incorporated, a corporation of New York No Drawing. Application September 26, 1947, Serial No. 776,425

10 Claims. (Cl. 260—67)

The present invention relates to the preparation of resins from heterocyclic thiols and aldehydes and, more particularly, to the preparation of resins from thiophenethiols and aldehydes.

The heterocyclic thiols with which this invention is concerned are thioalcohols of the heterocyclic compounds such as thiophene, furan, pyrrole, etc. The composition of these heterocyclic thiols having a 5-membered heterocyclic ring may be represented by the following structure:

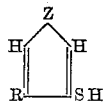

where Z is sulfur, oxygen or nitrogen, H is hydrogen and R is hydrogen or an electropositive substituent group. The structure of these thiols is reminiscent of the mercaptans or alkyl or aryl thiols, the structure of the latter of which may be represented as

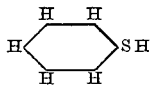

Although the reaction of mercaptans or alkyl or aryl thiols with aldehydes to form mercaptans is not new, there is no record in the literature of the preparation of any useful resins by the reaction of heterocyclic thiols with aldehydes. Accordingly, it is an object of the present invention to provide a method for preparing useful resins from thiols of 5-membered heterocyclic hydrocarbons and aldehydes. It is another object of the present invention to provide a method for preparing useful resins from thiophenethiol. It is a further object of the present invention to provide a method of preparing thermosetting resins from heterocyclic thiols and aldehydes. Other objects and advantages will become apparent from the following description.

While thermosetting resins can be produced by heating the thiol with only a slight excess of the molal equivalent of aldehyde in the presence of an acid catalyst such as hydrochloric acid or sulfuric acid, the preparation of water-soluble resins capable of being thermoset in the presence of alkaline catalysts is of particular interest. By reacting a thiol of the class described and an excess of an aldehyde in the presence of small amounts of a basic catalyst, a water-soluble resin is obtained which can be precipitated from solution by the addition of acid thereto or by prolonged heating. The precipitated resin can be thermoset by heating it to about 150 degrees centigrade, preferably in the presence of such accelerators as hexamethylenetetramine. By careful dehydration the acid-precipitated or water-soluble resins can be converted to thermoset resins. For example, the thiol is reacted with an excess of formaldehyde, say 2 to 3 equivalents of formaldehyde for each mole of thiol in the presence of an alkali metal hydroxide. When a temperature of 50 to 60° C. is employed, about 5 hours is required. The solution of resin is then neutralized with an acid, the alkali metal salt of which is extremely soluble in the water remaining in the final product and the solution subjected to vacuum distillation until a water content of less than 10 per cent has been reached. Suitable dyes, lubricants, etc. are then added and the mixture poured into a mold and heated until set.

On the other hand, resins suitable for coating cloth, paper, etc. and for use in laminating liquors can be made in the following manner. The thiol is reacted with more than one mole equivalent of the aldehyde in the presence of small amounts of a base such as an alkali metal hydroxide or carbonate and at temperatures up to about 150° C., although temperatures of about 50 to about 130° C. are preferred. The temperature is selected to correlate with the use to which the resin is to be put since the properties of the resin, particularly its water-solubility, are dependent on the temperature used. At elevated temperatures of about 130° C. the resins tend to precipitate from the aqueous reaction mixture.

Illustrative of the preparation of resins from thiols of the 5-membered heterocyclic hydrocarbons and an aldehyde in the presence of an alkaline catalyst are the preparation of resins from thiophenethiol described hereinafter.

Thiophenethiol

is most readily obtained in commercial quantities by the pyrolysis of "thiophene tar" obtained as a by-product in the production of thiophene from butane and sulfur as described in copending U. S. application Serial No. 693,176, filed August 27, 1946, in the names of Rowland C. Hansford, Herbert E. Rasmussen and Alexander N. Sachanen and now U. S. Patent No. 2,450,699. In the pyrolysis of this thiophene tar it is preferred to pass the tar and steam through a coil heated to 400 to 500° F. and flash the mixture into a separating zone where distillate and steam are taken overhead and residue is dropped into a steam-jacketed withdrawal zone. The oily material is separated from the aqueous condensate and is a source of thiophenethiol.

Example I

Five parts by weight of the lower boiling cut of the aforesaid oily condensate, boiling range 170° C. to 190° C. (crude thiophenethiol) and 10 parts by weight of an aqueous solution of formaldehyde containing about 36 per cent formaldehyde and known commercially as formalin solution, were mixed. About one part by weight of potassium hydroxide dissolved in 10 parts by weight of water was added to the mixture of thiol and aldehyde with stirring. The reaction was exothermic. After the mixture stood for about 16 hours it separated into two layers; a viscous liquid resin and an aqueous layer.

Example II

About 0.25 part by weight of sodium hydroxide was dissolved in about 40 parts by weight of formalin solution (0.5 mole of formaldehyde) and about 0.17 mole of thiophenethiol added in portions during about one hour. Although the reaction was exothermic, it was necessary to apply external heat to maintain a temperature of 55° C. The reaction mixture was maintained at about 55° C. for about 5 hours. The product was a clear, yellow-green, homogeneous liquid. After removal of water by distillation, about 30 parts by weight of a viscous green liquid was recovered. Upon heating a portion of this resin with a small percentage of hexamethylenetetramine in the usual rub test, it hardened to a thermoset resin in less than 90 seconds on a hot plate held at 150° C.

Example III

One part by weight of sodium hydroxide was mixed with 16.4 parts by weight of formalin solution (about 0.20 mole of formaldehyde). About 20 parts by weight of thiophenethiol (0.17 mole) was added slowly with stirring to the alkali-formalin solution. The thiophenethiol went into solution immediately until about 12 parts by weight, i. e. about 60 per cent, had been added. The remainder would not go into solution even after the reaction had been carried on for about 5 hours at 55° C. Unreacted thiol and water were removed and a residue amounting to about 10 to 15 parts by weight remained. This residue was a viscous green liquid resin. This resin when mixed with a small percentage of hexamethylenetetramine gave a positive dry-rub test for a thermosetting resin in 90 seconds.

We claim:

1. A method of preparing resins which comprises reacting a thiol of a 5-membered ring heterocyclic compound having only one hetero-atom in said ring selected from the group consisting of thiols of thiophene, furan and pyrrole and an excess of a mole equivalent of an aldehyde in the presence of an alkaline catalyst at temperatures of about 50° to about 150° C.

2. A method of preparing resins which comprises reacting a thiol of a 5-membered ring heterocyclic compound having only one hetero-atom in said ring selected from the group consisting of thiols of thiophene, furan and pyrrole and an excess of a mole equivalent of an aldehyde in the presence of an alkaline catalyst at temperatures of about 50° C. to about 130° C.

3. A method of preparing a thermoset resin which comprises dehydrating a water-soluble resin obtained by condensing a thiol of a 5 membered ring heterocyclic compound having only one hetero-atom in said ring selected from the group consisting of thiols of thiophene, furan and pyrrole with an excess of a mole equivalent of an aldehyde in the presence of a base at temperatures of about 50° to about 150° C.

4. The process as set forth and described in claim 3 wherein the water-soluble resin is cured by admixture with hexamethylenetetramine and heating the mixture so formed at 150° C.

5. A method of preparing resins which comprises reacting a thiol of a heterocyclic compound having a 5-membered heterocyclic ring containing only one hetero-atom selected from the group consisting of thiols of thiophene, furan and pyrrole and an excess of a mole equivalent of an aldehyde in the presence of an alkaline catalyst at a temperature of about 50° to about 130° C., separating said resin from the reaction mixture, mixing said separated resin with hexamethylenetetramine and heating said mixture to temperatures of about 150° C.

6. A method of preparing resins which comprises condensing thiophenethiol with an excess of a mole equivalent of formaldehyde in the presence of an alkaline catalyst at temperatures of about 50° C. to about 130° C.

7. A method of preparing resins which comprises condensing thiophenethiol and formaldehyde in the molal proportions of about 1 to about 3 in the presence of an alkaline catalyst at temperatures of about 50° C. to about 130° C. to obtain an aqueous solution of resin, removing a major portion of the water present, admixing hexamethylenetetramine with the dehydrated resin and heating the mixture so obtained at a temperature of about 150° C.

8. A water-soluble resin obtained by condensing a thiol of a heterocyclic compound having a 5-membered heterocyclic ring containing only one hetero-atom selected from the group consisting of thiols of thiophene, furan and pyrrole with an excess of a mole equivalent of an aldehyde in the presence of an alkaline catalyst at temperatures of about 50° to 130° C.

9. A thermoset resin obtained by curing a water-soluble resin with hexamethylenetetramine at temperatures of about 150° C., said water-soluble resin being obtained by condensing a thiol of a heterocyclic compound having a 5-membered heterocyclic ring containing only one hetero-atom selected from the group consisting of thiols, thiophene, furan and pyrrole with an excess of a mole equivalent of an aldehyde at about 50° C. in the presence of an alkaline catalyst.

10. A thermoset resin obtained by curing a water-soluble resin admixed with hexamethylenetetramine at temperatures of about 150° C., said water-soluble resin being obtained by condensing thiophenethiol with an excess of a mole equivalent of formaldehyde in the presence of an alkaline catalyst at temperatures of about 50° C.

PHILIP D. CAESAR.
ALEXANDER N. SACHANEN.

REFERENCES CITED

The following references are of record in the file of this patent:

UNITED STATES PATENTS

| Number | Name | Date |
| --- | --- | --- |
| 1,874,639 | Scott | Aug. 30, 1932 |

OTHER REFERENCES

Ser. No. 314,449, Zerweck (A. P. C.), published April 20, 1943.